(12) United States Patent
Liao et al.

(10) Patent No.: US 11,256,838 B2
(45) Date of Patent: Feb. 22, 2022

(54) ESTABLISHING METHOD FOR TIMING MODEL

(71) Applicants: Global Unichip Corporation, Hsinchu (TW); Taiwan Semiconductor Manufacturing Co., Ltd., Hsinchu (TW)

(72) Inventors: Hsin-Hsiung Liao, Hsinchu (TW); Min-Hsiu Tsai, Hsinchu (TW)

(*) Notice: Subject to any disclaimer, the term of this patent is extended or adjusted under 35 U.S.C. 154(b) by 143 days.

(21) Appl. No.: 16/865,406

(22) Filed: May 3, 2020

(65) Prior Publication Data
US 2021/0303767 A1  Sep. 30, 2021

(30) Foreign Application Priority Data

Mar. 30, 2020 (TW) ................................ 109110767

(51) Int. Cl.
*G06F 30/30* (2020.01)
*G06F 30/3315* (2020.01)
*G06F 119/12* (2020.01)

(52) U.S. Cl.
CPC ...... *G06F 30/3315* (2020.01); *G06F 2119/12* (2020.01)

(58) Field of Classification Search
CPC ............. G06F 30/3315; G06F 2119/12; G06F 2119/06
USPC ........................................................ 716/108
See application file for complete search history.

(56) References Cited

U.S. PATENT DOCUMENTS

| | | | | |
|---|---|---|---|---|
| 6,523,149 B1* | 2/2003 | Mehrotra | ............. | G06F 30/367 716/122 |
| 7,243,323 B2* | 7/2007 | Williams | ............ | G06F 30/3312 716/113 |
| 7,962,872 B2* | 6/2011 | Koithyar | ............ | G06F 30/3312 716/108 |
| 8,468,479 B2* | 6/2013 | Tehrani | ................. | G06F 30/367 716/108 |
| 2002/0188577 A1* | 12/2002 | Vidhani | ............... | G06F 30/367 706/14 |
| 2006/0248485 A1* | 11/2006 | Foreman | ............ | G06F 30/3312 716/113 |

* cited by examiner

*Primary Examiner* — Jack Chiang
*Assistant Examiner* — Brandon Bowers
(74) *Attorney, Agent, or Firm* — JCIPRNET (57) ABSTRACT

An establishing method for the timing model includes: identifying at least one first victim path which is a boundary path in a circuit block; determining whether to remove a first aggressor path corresponding to the first victim path according to a transmission delay on the first victim path; finding a plurality of high-fanout circuit devices with a fanout number greater than a preset value in the circuit block; determining whether to remove each of the high-fanout circuit devices according to a connection position of each of the high-fanout circuit devices; identifying a plurality of second victim paths corresponding to each of the high-fanout circuit devices, and determining whether to keep or remove a second aggressor path corresponding to each of the second victim paths according to a transmission delay of each of the second victim paths.

16 Claims, 5 Drawing Sheets

- Identifying, between any input terminal and any output terminal in a circuit block, at least one transmission path which is not connected to any register, and keeping the at least one transmission path — S410
- Identifying at least one multiple input circuit device in the kept at least one transmission path, and keeping at least one driving device and a loading device corresponding to the at least one multiple input circuit device — S420
- Removing the kept at least one transmission path, and circuit devices other than the kept at least one driving device and the loading device — S430

ESTABLISHING METHOD FOR TIMING MODEL

CROSS-REFERENCE TO RELATED APPLICATION

This application claims the priority benefit of Taiwan application no. 109110767, filed on Mar. 30, 2020. The entirety of the above-mentioned patent application is hereby incorporated by reference herein and made a part of this specification.

TECHNICAL FIELD

The invention relates to an establishing method for a timing model, and particularly relates to an establishing method for a timing model of an integrated circuit.

BACKGROUND

In the current circuit design, it is a very important action to establish a timing model for the circuit and perform a static timing analysis based on it. In today's increasingly complex circuit settings, to establish the timing model for the circuit and perform the static timing analysis, based on the requirements of analysis accuracy, either a large amount of analysis time or a large amount of hardware resources will be required. Therefore, the action of establishing the timing model of the circuit often cannot be completed in real time.

SUMMARY

The invention provides a variety of establishing methods for a timing model, which can effectively reduce the time required for circuit analysis.

The establishing methods for the timing model of the invention are executed through a controller. An establishing method for the timing model includes: identifying at least one first victim path which is a boundary path in a circuit block; determining whether to remove a first aggressor path corresponding to the first victim path according to a transmission delay on the first victim path; finding a plurality of high-fanout circuit devices with a fanout number greater than a preset value in the circuit block; determining whether to remove each of the high-fanout circuit devices according to a connection position of each of the high-fanout circuit devices; identifying a plurality of second victim paths corresponding to each of the high-fanout circuit devices, and determining whether to keep or remove a second aggressor path corresponding to each of the second victim paths according to a transmission delay of each of the second victim paths.

Another establishing method for a timing model of the invention includes: identifying, between any input terminal and any output terminal in a circuit block, at least one transmission path which is not connected to any register, and keeping the transmission path described above; identifying at least one multiple input circuit device in the kept transmission path, and keeping a driving device corresponding to the multiple input circuit device and a loading device corresponding to the driving device; and removing the kept transmission path, and circuit devices other than the kept driving device and the loading device.

Another establishing method for a timing model of the invention includes: identifying, according to a layout of an integrated circuit, a plurality of peripheral circuit blocks and a plurality of internal circuit blocks of the integrated circuit; and executing a first timing analysis mechanism for each of the peripheral circuit blocks, and executing a second timing analysis mechanism for each of the peripheral circuit blocks. Here, the first timing analysis mechanism and the second timing analysis mechanism are the establishing methods for the timing model described above, respectively.

Based on the above, according to the embodiments of the invention, the victim path and the corresponding aggressor path in the circuit block are analyzed, and then whether to remove the aggressor path and its corresponding circuit device is determined according to the transmission delay on the victim path. Under the premise that the accuracy of timing analysis is not affected, the complexity of the timing model of the circuit may be effectively reduced and the efficiency of the static timing analysis may also be improved.

BRIEF DESCRIPTION OF THE DRAWINGS

FIG. 3A to FIG. 3C are schematic diagrams illustrating various actions of the establishing method for the timing model according to embodiments of the invention.

DETAILED DESCRIPTION

Figure 1:
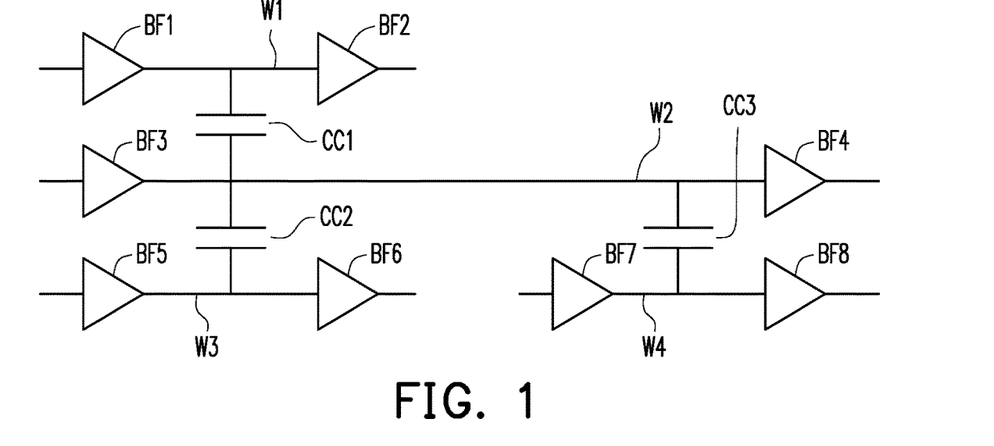
FIG. 1 is a schematic diagram illustrating a relationship between an aggressor path and a victim path in a circuit block.

Referring to FIG. 1, FIG. 1 is a schematic diagram illustrating a relationship between an aggressor path and a victim path in a circuit block. In the circuit block, due to layout positions, multiple circuit devices generate large or small coupling capacitances with each other. In FIG. 1, a transmission wire W1 between buffers BF1 and BF2 may generate a coupling capacitance CC1 with a transmission wire W2 between buffers BF3 and BF4; a transmission wire W3 between buffers BF5 and BF6 may generate a coupling capacitance CC2 with the transmission wire W2 between the buffers BF3 and BF4; a transmission wire W4 between buffers BF7 and BF8 may generate a coupling capacitance CC3 with the transmission wire W2 between the buffers BF3 and BF4.

Under the effect of these coupling capacitances CC1 to CC3, a signal transmitted on the transmission wire W2 may cause a voltage jitter due to transitions of transmission signals on the transmission wires W1, W3 and W4. Under such condition, a path formed by the transmission wire W2 may be referred to as a victim path. Paths formed by the transmission wires W1, W3 and W4 may be referred to as aggressor paths.

Figure 2:
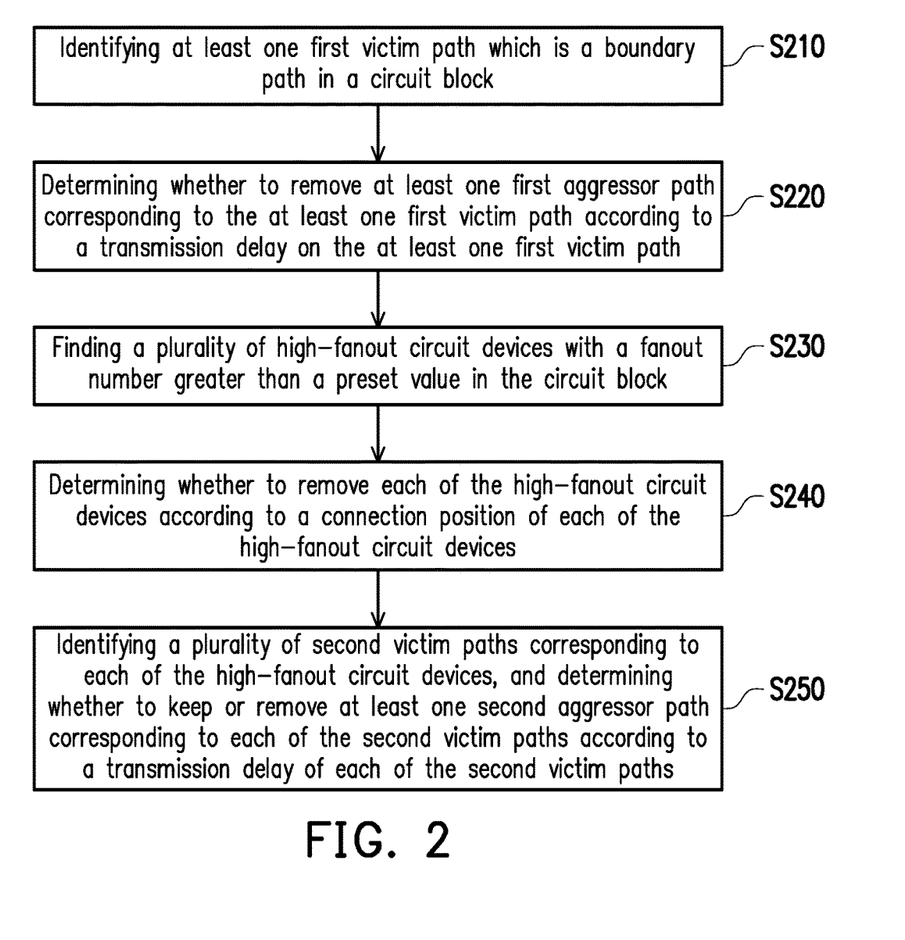
FIG. 2 is a flowchart of an establishing method for a timing model according to an embodiment of the invention.

The following refers to FIG. 2, and FIG. 2 is a flowchart of an establishing method for a timing model according to an embodiment of the invention. The establishing method for the timing model in the present embodiment of the invention may be executed through a controller. Here, the controller may receive a gate level netlist of the circuit, and establish the timing model according to the gate level netlist.

Figure 3A:
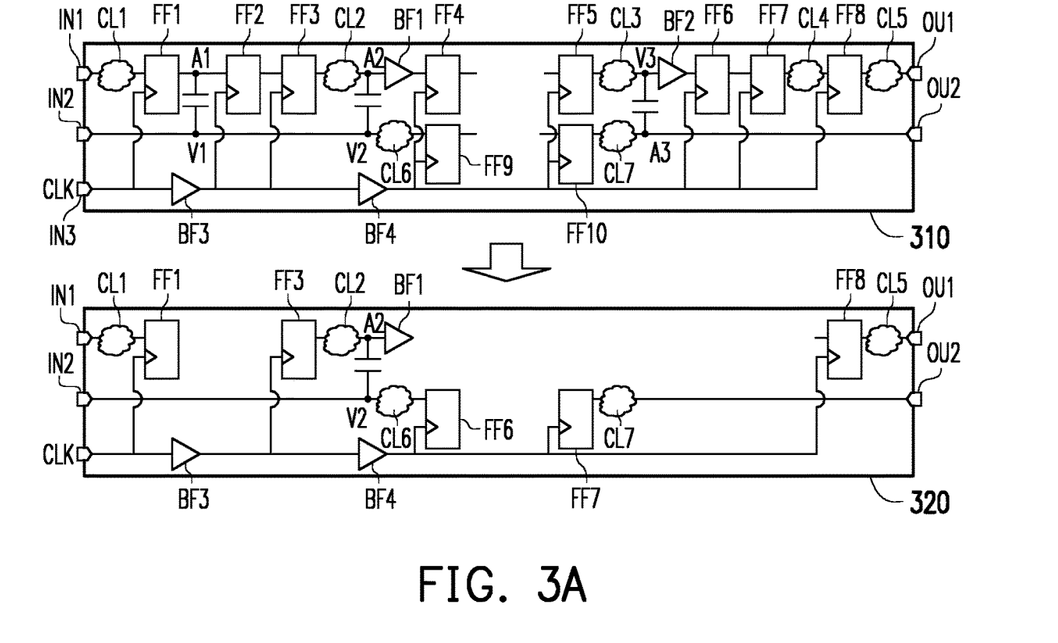

The following refers to FIG. 2 and FIG. 3A together, and FIG. 3A is a schematic diagram illustrating actions of the establishing method for the timing model according to an embodiment of the invention. In step S210, according to the gate level netlist of the circuit, one or more first victim paths which are boundary paths in a circuit block are identified. Here, the so-called boundary path may be determined according to an input terminal, an output terminal and an internal register of the circuit block. In the circuit block, a register directly connected to the input terminal and the output terminal of the circuit block may be regarded as the boundary register. A connection path between the boundary register and the corresponding input and output terminals is the boundary path. In addition, in the circuit block, when there is no register between the input terminal and the output terminal, a path formed between the input terminal and the output terminal may also be the boundary path.

In FIG. 3A, a circuit block 310 is an original circuit block, and a circuit block 320 is a simplified circuit block. The circuit block 310 has input terminals IN1 to IN3 and output terminals OU1 and OU2. Among them, the input terminal IN3 receives a clock signal CLK. The circuit block 310 additionally includes combinational logic circuits CL1 to CL7, registers FF1 to FF10 and buffers BF1 to BF4. By identifying the circuit block 310 through step S210, it can be determined that there are two boundary paths (which are victim paths V1 and V2) between the input terminal IN2 and the register FF9. Among them, an aggressor path A1 corresponding to the victim path V1 is formed between the registers FF1 and FF2, and an aggressor path A2 corresponding to the victim path V2 is formed between the combinational logic circuit CL2 and the register FF4. Moreover, through step S210, it is further determined that there is a victim path V3 between the output terminal OU2 and the register FF10 (through the combinational logic circuit CL7). The victim path V3 corresponds to an aggressor path A3, wherein the aggressor path A3 is formed between the combinational logic circuit CL3 and the buffer BF2.

Next, in step S220, whether to remove the aggressor paths A1 to A3 corresponding to the victim paths V1 to V3 is determined according to transmission delays on the victim paths V1 to V3. For instance, in the circuit block 310, it is assumed that the transmission delay of an integrated signal on the victim path V1 is equal to 0, and the transmission delays of integrated signals on the victim paths V2 and V3 are greater than 0. In step S220, when the transmission delay on the victim path is greater than 0 (e.g., the victim path V2), only a fanin driving device and a loading device in the corresponding aggressor path (e.g., the aggressor path A2) are kept. Corresponding to FIG. 3A, the fanin driving device (the register FF3 and the combinational logic circuit CL2) and one loading device (the buffer BF1) of the aggressor path A2 are kept.

In addition, when the transmission delay of the victim path is equal to 0 (e.g., the victim path V1), a loading device and a driving device of the corresponding aggressor path (e.g., the aggressor path A1) and a coupling capacitance between the aggressor path and the victim path are removed. Corresponding to FIG. 3A, components to be removed are: the aggressor path A1; the load device (the register FF2) of the aggressor path A1; and the coupling capacitance between the aggressor path A1 and the victim path V1.

It is worth mentioning that in this embodiment, based on the victim path V3 which is not the boundary path, even if the transmission delay on the victim path V3 is greater than 0, the driving device of the aggressor path A3 corresponding to the victim path V3 (the register FF5 and the combinational logic circuit CL3), the loading device of the aggressor path A3 (the registers FF6 and FF7, the buffer BF2, and the combinational logic circuit CL4), the coupling capacitance between the aggressor path A3 and the victim path V3 are not kept but needed to be removed.

Here, it should be noted that in this embodiment, because the registers FF1 and FF8 are the boundary registers, the registers FF1 and FF8 and the combinational logic circuits CL1 and CL5 respectively connected thereto will not be removed.

After going though actions of steps S210 and S220, the simplified circuit block 320 may be obtained.

Figure 3B:
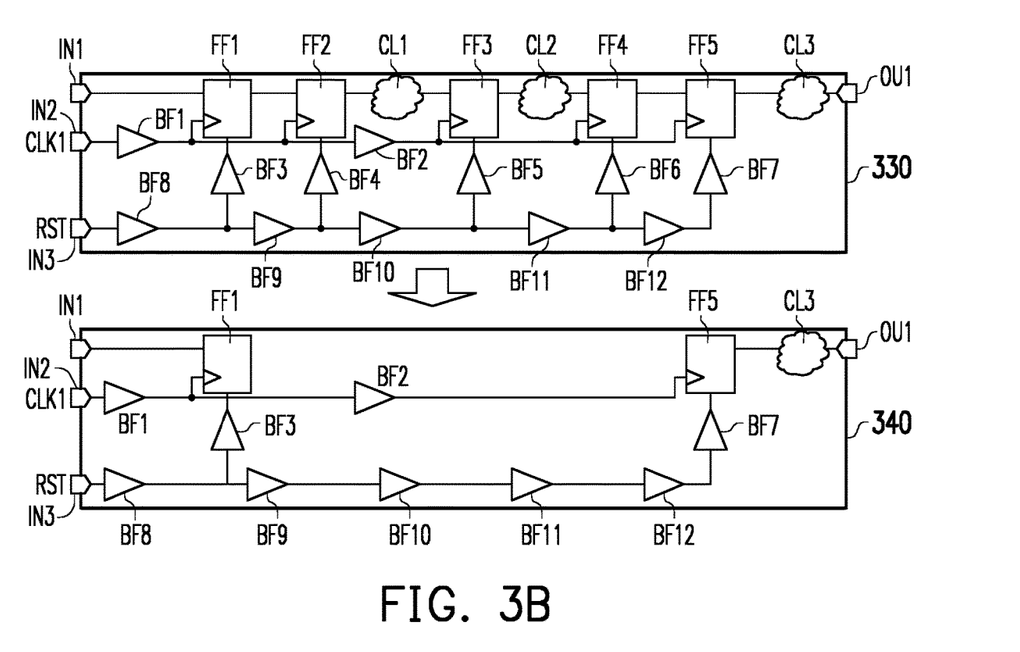

The following refers to FIG. 2 and FIG. 3B together, and FIG. 3B is a schematic diagram illustrating actions of the establishing method for the timing model according to another embodiment of the invention. In FIG. 3B, a circuit block 330 is an original circuit block, and a circuit block 340 is a simplified circuit block. The circuit block 330 includes registers FF1 to FF5, combinational logic circuits CL1 to CL3 and buffers BF1 to BF12. The circuit block 330 further includes input terminals IN1 to IN3 and an output terminal OU1. The input terminals IN2 and IN3 receive a clock signal CLK1 and a reset signal RST, respectively.

Referring to FIG. 2, in step S230, the circuit block is analyzed, and a plurality of high-fanout circuit devices with a fanout number greater than a preset value in the circuit block are found accordingly. Corresponding to the circuit block 330, the buffers BF3 to BF12 correspondingly connected to the input terminal IN3 may be determined as the high-fanout circuit devices.

Next, in step S240, whether to remove each of the high-fanout circuit devices is determined according to a connection position of each of the high-fanout circuit devices. Specifically, in step S240, when the high-fanout circuit device is connected between an input terminal of the circuit block and a boundary register, it may be determined to keep that high-fanout circuit device. In contrast, if the high-fanout circuit device is not connected between the input terminal of the circuit block and the boundary register but connected between the input terminal of the circuit block and an internal register, that high-fanout circuit device is then removed. Corresponding to FIG. 3B, in the circuit block 330, the buffers BF8 and BF3 are connected between the input terminal IN3 and the boundary register (the register FF1), and the buffers BF9, BF10, BF11, BF12 and BF7 are connected between the input terminal IN3 and another boundary register (the register FF5). Therefore, the buffers BF8, BF3, BF9, BF10, BF11, BF12 and BF7 are all kept, and the buffers BF4 to BF6 are removed. In this embodiment, the registers FF2 to FF4 and the combinational logic circuits CL1 and CL2 may be removed according to steps in the foregoing embodiment of the invention so that the simplified circuit block 340 can be generated.

Incidentally, the high-fanout device in this embodiment may be a circuit device in a clock tree for transmitting the clock signal CLK1 or a circuit device in a transmission tree for transmitting the reset signal RST, but not limited thereto.

Figure 3C:
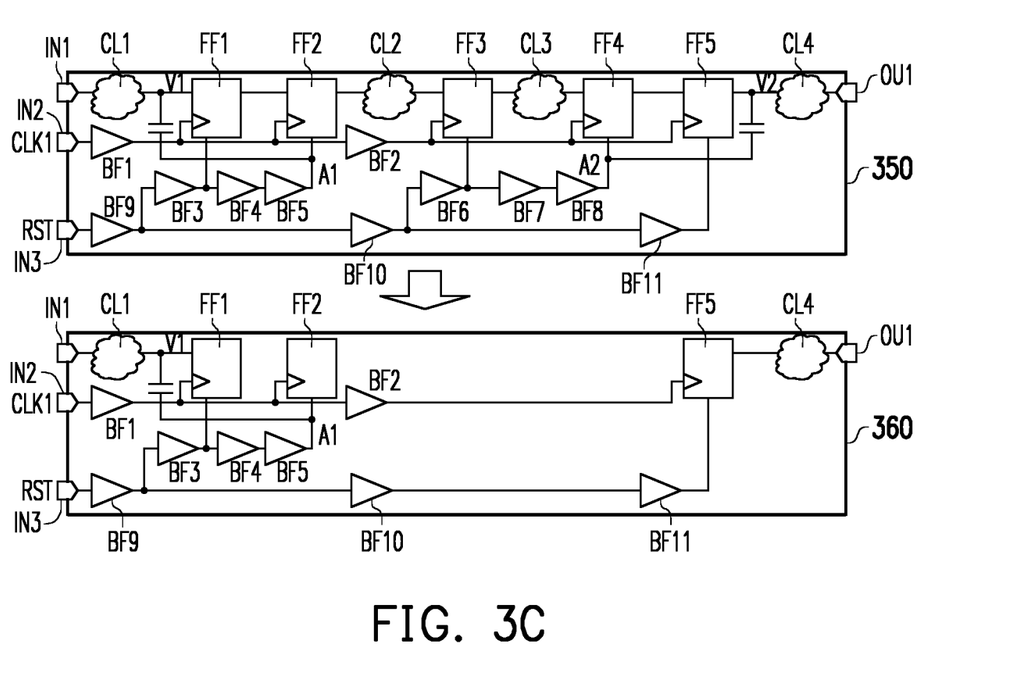

The following refers to FIG. 2 and FIG. 3C together, and FIG. 3C is a schematic diagram illustrating actions of the establishing method for the timing model according to another embodiment of the invention. In FIG. 3C, a circuit block 350 is an original circuit block, and a circuit block 360 is a simplified circuit block. The circuit block 350 includes buffers BF1 to BF11, registers FF1 to FF5 and combinational logic circuits CL1 to CL4 and includes input terminals IN1 to IN3 and an output terminal OU1. The input terminals IN2 and IN3 of the circuit block 360 receive a clock signal CLK1 and a reset signal RST, respectively.

Following step S240, in step S250, a plurality of victim paths corresponding to each of the high-fanout circuit devices are identified, and whether to keep or remove an aggressor path corresponding to each of the victim paths is determined according to a transmission delay of each of the victim paths. Here, the victim paths in step S250 are signal transmission paths among a plurality of boundary paths that may be affected by the aggressor paths which are found by analyzing said boundary paths in the circuit block. Corresponding to the circuit block 350, among the boundary paths of the circuit block 350, a victim path V1 between the combinational logic circuit CL1 and the register FF1 and a victim path V2 between the combinational logic circuit CL4 and the register FF5 may be identified. The victim path V1 corresponds to an aggressor path A1 on an output end of the buffer BF5, and the victim path V2 corresponds to an aggressor path A2 on an output end of the buffer BF8. The buffers BF5 and BF8 are the high-fanout circuit devices.

Next, in step S250, whether to keep or remove the aggressor path corresponding to the victim path is determined according to the transmission delay of the victim path. Then, only a fanin driving device and a loading device connected to the aggressor path are kept when the transmission delay of each of the victim paths is greater than 0; and the aggressor path, a loading device and a driving device of the aggressor path and a coupling capacitance between the aggressor path and each of the victim paths are removed when the transmission delay of each of the victim paths is equal to 0.

Corresponding to the circuit block 350, if the signal integrated transmission delay on the victim path V1 is greater than 0, a fanin driving device (buffers BF9, BF3, BF4 and BF5) and a loading device (the register FF2) connected to the aggressor path A1 are kept. In contrast, if a signal integrated transmission delay on the victim path V2 is equal to 0, the aggressor path A2, a loading device (the register FF4) and a driving device (the buffers BF6 to BF8) of the aggressor path A2 and a coupling capacitance between the aggressor path A2 and the victim path V2 are removed.

Moreover, in this embodiment, the register FF3, the combinational logic circuits CL2 and CL3 may be removed according to steps described in the foregoing embodiment of the invention.

According to the above actions, the simplified circuit block 360 may be generated.

Figure 4:
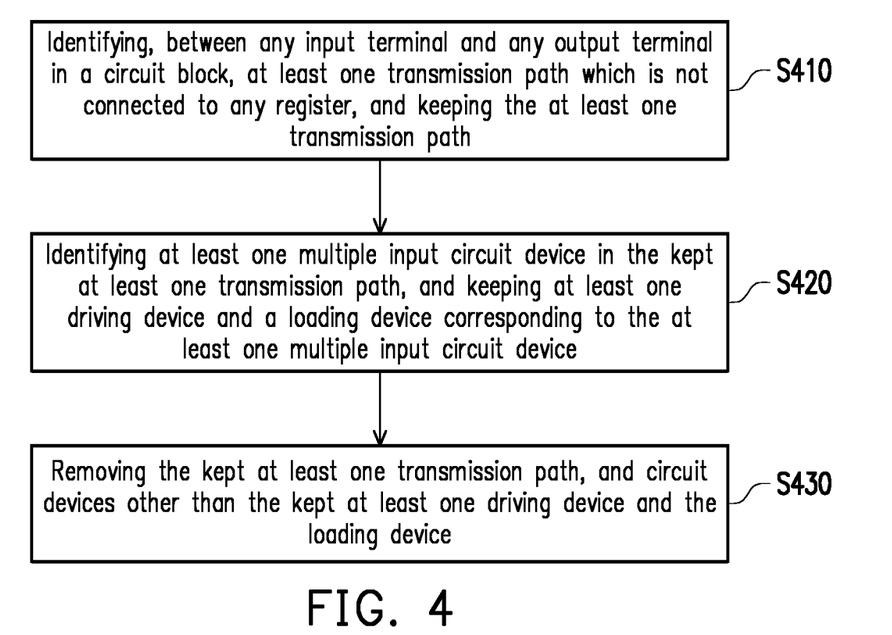
FIG. 4 is a flowchart of an establishing method for a timing model according to another embodiment of the invention.
Figure 5A:
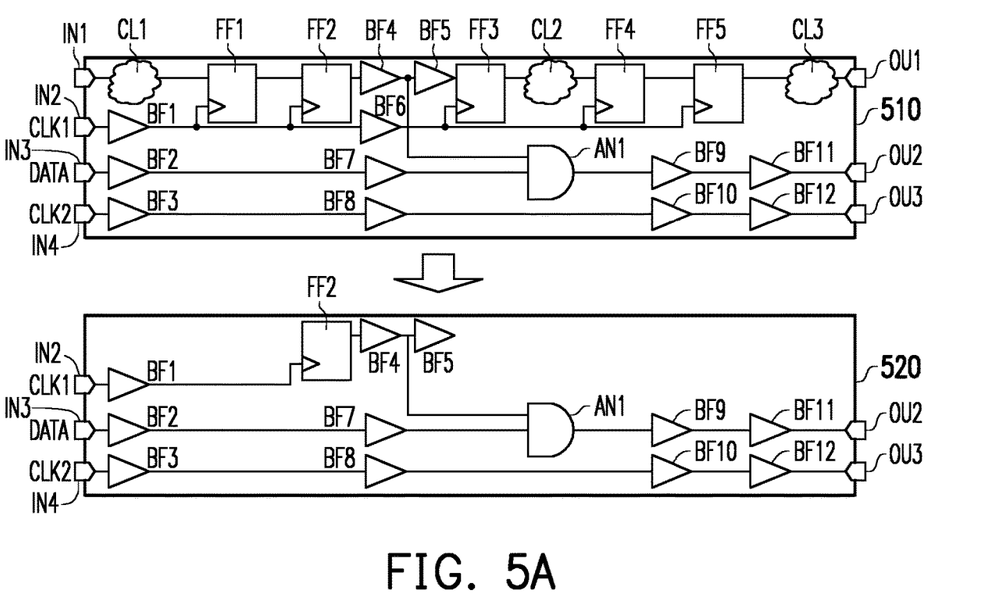
FIG. 5A and FIG. 5B are schematic diagrams illustrating various actions of the establishing method for the timing model according to embodiments of the invention.

Referring to FIG. 4, FIG. 4 is a flowchart of an establishing method for a timing model according to another embodiment of the invention. Here, the establishing method for the timing model may be executed through a controller according to a gate level netlist of the circuit. In step S410, between any input terminal and any output terminal in a circuit block, one ore more transmission paths not connected to any register are identified, and the identified transmission paths are kept. The following refers to FIG. 4 and FIG. 5A together, and FIG. 5A is a schematic diagram illustrating actions of the establishing method for the timing model according to an embodiment of the invention. Here, a circuit block 510 is an original circuit block, and a circuit block 520 is a simplified circuit block. The circuit block 510 includes registers FF1 to FF5, buffers BF1 to BF12, a multiple input device AN1 and combinational logic circuits CL1 to CL3, and includes input terminals IN1 to IN4 and output terminals OU1 to OU3. Here, the input terminals IN2 to IN4 receive a clock signal CLK1, a data signal DATA and a clock signal CLK2, respectively.

According to step S410, no register is connected between the input terminal IN3 and the output terminal OU2, and no register is connected between the input terminal IN4 and the output terminal OU3. Therefore, a transmission path between the input terminal IN3 and the output terminal OU2 and the transmission path between the input terminal IN4 and the output terminal OU3 may be kept. In other words, the input terminal IN3, the output terminal OU2 and the buffers BF2, BF7, BF9 and BF11 therebetween need to be kept, and the input terminal IN4, the output terminal OU3 and the buffers BF3, BF8, BF10 and BF12 therebetween need to be kept. Next, step S420 is performed.

In step S420, at least one multiple input circuit device in the kept transmission path is identified, and at least one driving device and a loading device corresponding to the multiple input circuit device are kept. Corresponding to the circuit block 520, the multiple input circuit device AN1 included in the kept transmission path between the input terminal IN3 and the output terminal OU2 may be identified. The driving device corresponding to the multiple input circuit device AN1 (the input terminal IN2, the buffers BF1 and BF4 and the register FF2) may be kept, and the loading device of the aforementioned driving devices (the buffer BF3) needs to be kept.

Next, in step S430, in the circuit block, except for the aforementioned circuit devices determined as to be kept, all other circuit devices need to be removed. Corresponding to the circuit block 510, other than the input terminals IN2 to IN4, the register FF2, the buffers BF1 to BF5 and BF7 to BF12, the multiple input circuit device AN1 and the output terminals OU2 and OU3 which need to kept, the rest of circuit devices all need to be removed so as to generate the simplified circuit block 520.

Figure 5B:
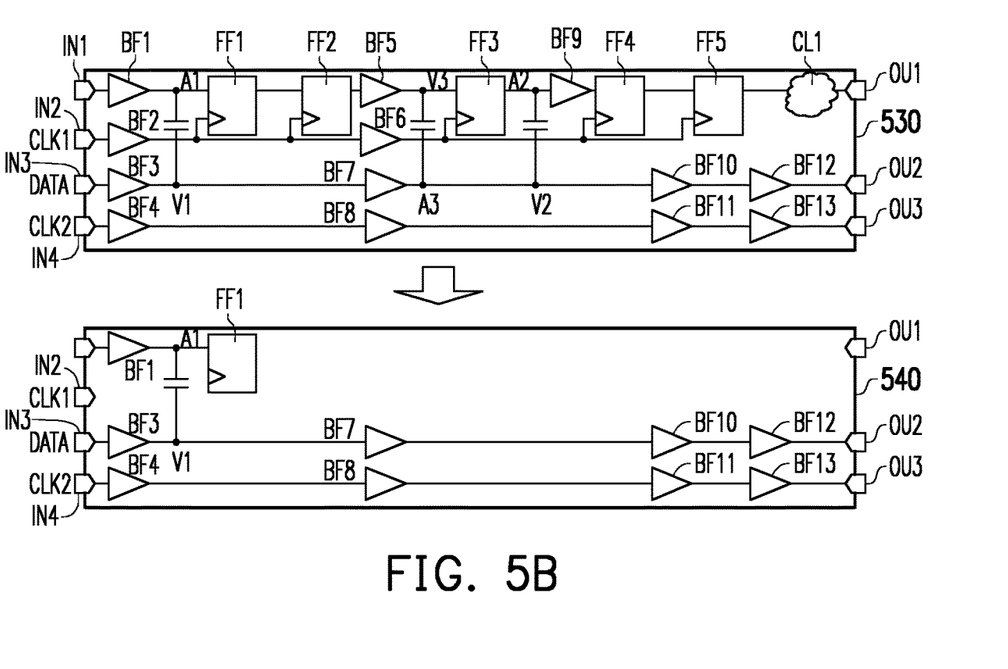

The following refers to FIG. 5B, and FIG. 5B is a schematic diagram illustrating actions of the establishing method for the timing model according to another embodiment of the invention. Here, circuit blocks 530 and 540 are an original circuit block and a simplified circuit block, respectively. The circuit block 530 includes registers FF1 to FF5, buffers BF1 to BF13 and a combinational logic circuit CL1, and includes input terminals IN1 to IN4 and output terminals OU1 to OU3.

In this embodiment of the invention, following the action flow of FIG. 4, the establishing method for the timing model further includes identifying one or more victim paths and a corresponding aggressor path in the transmission path. Also, whether to remove the corresponding aggressor path is determined according to a transmission delay of the victim path. Corresponding to the circuit block 530, victim paths V1 and V2 are included in a transmission path between the input terminal IN3 and the output terminal OU2. A victim path V3 is included in a transmission path between the input terminal IN4 and the output terminal OU3. The victim paths V1 and V2 respectively correspond to aggressor paths A1 and A2, and the victim path V3 corresponds to an aggressor path A3.

In FIG. 5B, a transmission delay of the victim path V1 is greater than 0. Therefore, a driving device (the buffer BF1) and a loading device (the register FF1) of the aggressor path A1 and a coupling capacitance between the victim path V1 and the aggressor path A1 will be kept. Regarding the victim paths V2 and V3, a transmission delay of the victim path V2 is equal to 0, and a transmission delay of the victim path V3 is greater than 0. However, because the victim path V3 is not the boundary path, driving devices and loading devices corresponding to the aggressor paths A2 and A3 (the registers FF2 to FF5, the buffers BF5 and BF7 and the combinational logic circuit CL1), a coupling capacitance between the aggressor path A2 and a victim path V2 and the coupling capacitance between the aggressor path A3 and the victim path V3 are all removed. Accordingly, the simplified circuit block 540 may be generated.

Figure 6:
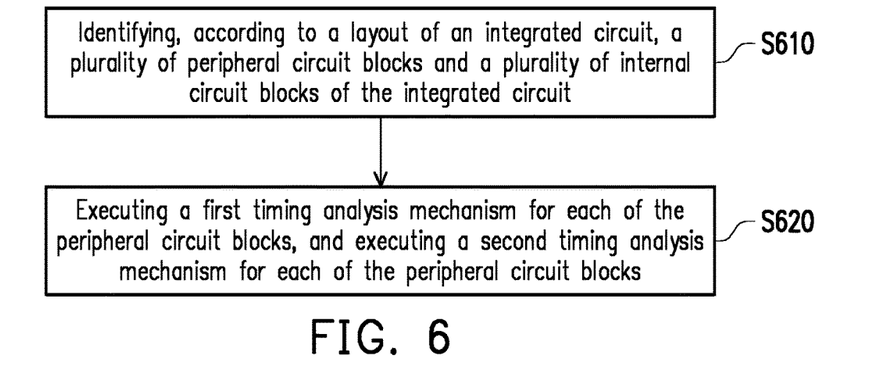
FIG. 6 is a flowchart of an establishing method for a timing model according to another embodiment of the invention.

The following refers to FIG. 6, and FIG. 6 is a flowchart of an establishing method for a timing model according to another embodiment of the invention. The action flow of FIG. 6 is executed by a controller. In step S610, according to a layout of an integrated circuit, a plurality of peripheral circuit blocks and a plurality of internal circuit blocks of the integrated circuit are identified. In step S620, a first timing analysis mechanism is executed for each of the peripheral circuit blocks, and a second timing analysis mechanism executed for each of the peripheral circuit blocks. Here, the first timing analysis mechanism may be executed according to action flow in the embodiment of FIG. 2 of the invention and the second timing analysis mechanism may be executed according to action flow in the embodiment of FIG. 4 of the invention so as to establish a timing model of the integrated circuit.

Figure 7:
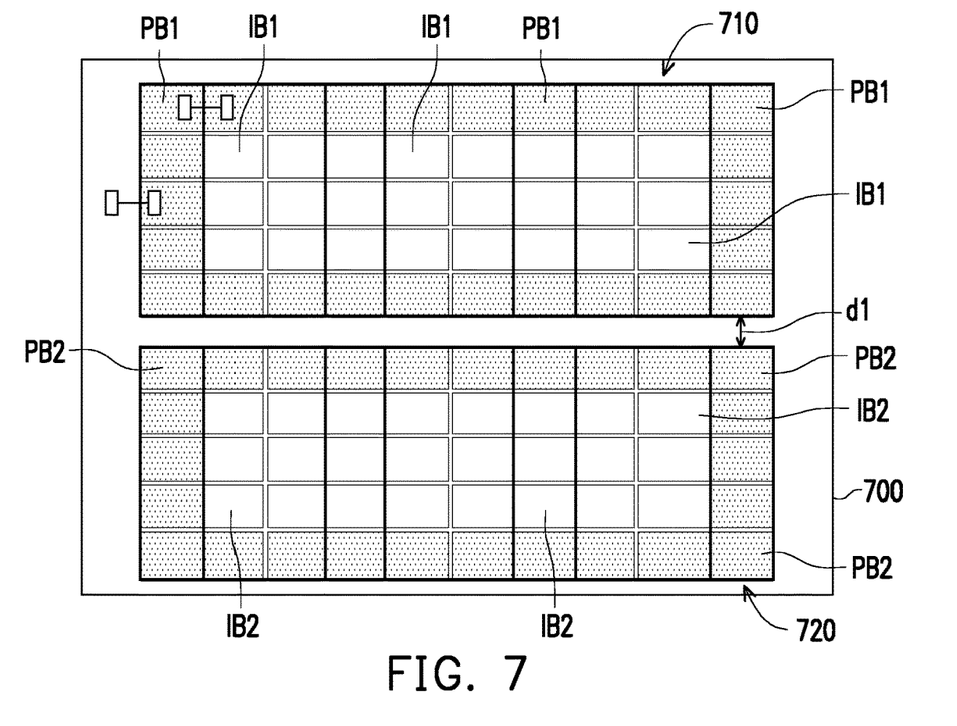
FIG. 7 is a schematic diagram illustrating an establishing method of a timing model of an integrated circuit according to an embodiment of the invention.

The following refers to FIG. 6 and FIG. 7 together, and FIG. 7 is a schematic diagram illustrating actions of the establishing method for the timing model of the integrated circuit according to an embodiment of the invention. Here, according to layout positions, an integrated circuit 700 may include two circuit partitions 710 and 720. Among them, the circuit partition 710 includes a plurality of peripheral circuit blocks PB1 and a plurality of internal circuit blocks IB1, and the circuit partition 720 includes a plurality of peripheral circuit blocks PB2 and a plurality of internal circuit blocks IB2. In the circuit partition 710, the peripheral circuit blocks PB1 surround the outside of the internal circuit blocks IB1. In the circuit partition 720, the peripheral circuit blocks PB2 surround the outside of the internal circuit blocks IB2. In addition, a distance d1 may be provided between the circuit partitions 710 and 720, wherein the distance d1 is greater than 10 micro meters, for example.

In this embodiment, the number of circuit partitions in the integrated circuit 700 may also be one or a plurality (greater than two) instead of being limited only to be two. The illustration in FIG. 7 is only an illustrative example, and is not intended to limit the scope of the invention.

Figure 8:
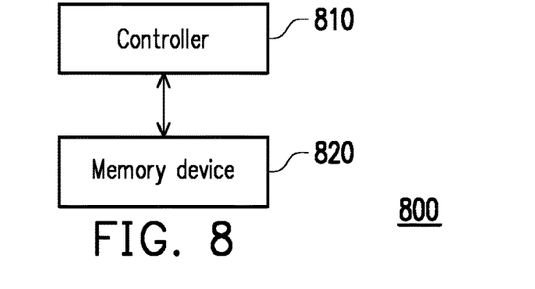
FIG. 8 is a schematic diagram illustrating an electronic device for establishing a timing model according to an embodiment of the invention.

Referring to FIG. 8, FIG. 8 is a schematic diagram illustrating an electronic device for establishing a timing model according to an embodiment of the invention. An electronic device 800 includes a controller 810 and a memory device 820. The controller 810 may be used to execute the action flows of FIG. 2, FIG. 4 and FIG. 6. The memory device 820 is coupled to the controller 810, and may be used to store a gate level netlist of the circuit and various information required during operations of the controller 810. The controller 810 may execute a static timing analysis (STA) for the circuit according to the established timing model, and provide a circuit designer better timing arrangement for the designed circuit.

In this embodiment, the controller 810 may be any form of processor with computing capability. The memory device 820 may be a data storage device well known to those skilled in the art such as any type of memory, hard disk drive or optical disk without any particular limitations.

Through the timing model established by the action flows of the embodiments of the invention, the controller 810 can quickly complete the static timing analysis performed on the circuit without affecting the accuracy, thereby improving the accuracy of the designed circuit.

In summary, according to the invention, the victim path and the corresponding aggressor path in the circuit block are analyzed, and then whether to remove the aggressor path and its corresponding circuit device is determined according to the transmission delay on the victim path. Under the premise that the accuracy of timing analysis is not affected, the complexity of the timing model of the circuit may be effectively reduced and the efficiency of the static timing analysis may also be improved. In the invention, for the circuit blocks arranged in different positions, analysis and simplification may be performed on circuit block to generate the timing model based on different mechanisms in the embodiments of the invention.

The invention claimed is:

1. An establishing method for a timing model, comprising:
  providing a controller to execute steps of:
    identifying at least one first victim path which is a boundary path in a circuit block;
    determining whether to remove at least one first aggressor path corresponding to the at least one first victim path according to a transmission delay on the at least one first victim path;
    finding a plurality of high-fanout circuit devices with a fanout number greater than a preset value in the circuit block;
    determining whether to remove each of the high-fanout circuit devices according to a connection position of each of the high-fanout circuit devices; and
    identifying a plurality of second victim paths corresponding to each of the high-fanout circuit devices, and determining whether to keep or remove at least one second aggressor path corresponding to each of the second victim paths according to a transmission delay of each of the second victim paths.

2. The establishing method for the timing model according to claim 1, wherein the step of determining whether to remove the at least one first aggressor path corresponding to the at least one first victim path according to the transmission delay on the at least one first victim path comprises:
  keeping only a fanin driving device and a loading device on the at least one first aggressor path when the transmission delay on the at least one first victim path is greater than 0; and
  removing the at least one first aggressor path when the transmission delay on the at least one first victim path is equal to 0.

3. The establishing method for the timing model according to claim 1, wherein the step of removing the at least one first aggressor path when the transmission delay on the at least one first victim path is equal to 0 further comprises:
  removing a loading device and a driving device of the at least one first aggressor path and a coupling capacitance between the at least one first aggressor path and the at least one first victim path.

4. The establishing method for the timing model according to claim 1, wherein the step of determining whether to remove each of the high-fanout circuit devices according to the connection position of each of the high-fanout circuit device comprises:

keeping each of the high-fanout circuit devices when each of the high-fanout circuit devices is connected between an input terminal of the circuit block and a boundary register; and removing each of the high-fanout circuit devices when each of the high-fanout circuit devices is connected between the input terminal of the circuit block and an internal register which is not the boundary register.

5. The establishing method for the timing model according to claim 1, wherein the step of determining whether to keep or remove the at least one second aggressor path corresponding to each of the second victim paths according to the transmission delay of each of the second victim paths comprises:

keeping only a fanin driving device and a loading device connected to the at least one second aggressor path when the transmission delay of each of the second victim paths is greater than 0; and removing the at least one second aggressor path, a loading device and a driving device of the at least one second aggressor path and a coupling capacitance between the at least one second aggressor path and each of the second victim paths when the transmission delay of each of the second victim paths is equal to 0.

6. The establishing method for the timing model according to claim 1, wherein the boundary path is directly connected to an input terminal of the circuit block or an output terminal of the circuit block.

7. An establishing method for a timing model, comprising:

providing a controller to execute steps of:

identifying, between any input terminal and any output terminal in a circuit block, at least one transmission path which is not connected to any register, and keeping the at least one transmission path;

identifying at least one multiple input circuit device in the kept at least one transmission path, and keeping at least one driving device corresponding to the at least one multiple input circuit device and a loading device of the at least one driving device; and removing the kept at least one transmission path, and circuit devices other than the kept at least one driving device and the loading device.

8. The establishing method for the timing model according to claim 7, further comprising:

identifying at least one victim path and at least one aggressor path corresponding thereto in the at least one transmission path; and determining whether to remove the at least one aggressor path according to a transmission delay of the at least one victim path.

9. The establishing method for the timing model according to claim 8, wherein the step of determining whether to remove the at least one aggressor path according to the transmission delay of the at least one victim path comprises:

keeping only a fanin driving device and a loading device on the at least one aggressor path when the transmission delay on the at least one victim path is greater than 0; and removing the at least one aggressor path and a plurality of circuit devices correspondingly connected to the at least one aggressor path when the transmission delay of the at least one victim path is equal to 0.

10. An establishing method for a timing model, comprising:

providing a controller to execute steps of:

identifying, according to a layout of an integrated circuit, a plurality of peripheral circuit blocks and a plurality of internal circuit blocks of the integrated circuit; and executing a first timing analysis mechanism for each of the peripheral circuit blocks, and executing a second timing analysis mechanism for each of the peripheral circuit blocks, wherein the first timing analysis mechanism comprises:

identifying at least one first victim path which is a boundary path in each of the peripheral circuit blocks;

determining whether to remove at least one first aggressor path corresponding to the at least one first victim path according to a transmission delay on the at least one first victim path;

finding a plurality of high-fanout circuit devices with a fanout number greater than a preset value in the circuit block;

determining whether to remove each of the high-fanout circuit devices according to a connection position of each of the high-fanout circuit devices; and identifying a plurality of second victim paths corresponding to each of the high-fanout circuit devices, and determining whether to keep or remove at least one second aggressor path corresponding to each of the second victim paths according to a transmission delay of each of the second victim paths, wherein the second timing analysis mechanism comprises:

identifying, between any input terminal and any output terminal in each of the internal circuit blocks, at least one transmission path which is not connected to any register, and keeping the at least one transmission path;

identifying at least one multiple input circuit device in the kept at least one transmission path, and keeping at least one driving device corresponding to the at least one multiple input circuit device and a loading device of the at least one driving device; and removing the kept at least one transmission path, and circuit devices other than the kept at least one driving device and the loading device.

11. The establishing method for the timing model according to claim 10, wherein the step of determining whether to remove the at least one first aggressor path corresponding to the at least one first victim path according to the transmission delay on the at least one first victim path comprises:

keeping only a fanin driving device and a loading device on the at least one first aggressor path when the transmission delay on the at least one first victim path is greater than 0; and removing the at least one first aggressor path when the transmission delay on the at least one first victim path is equal to 0.

12. The establishing method for the timing model according to claim 11, wherein the step of removing the at least one first aggressor path when the transmission delay on the at least one first victim path is equal to 0 further comprises:

removing a loading device and a driving device of the at least one first aggressor path and a coupling capacitance between the at least one first aggressor path and the at least one first victim path.

13. The establishing method for the timing model according to claim 11, wherein the step of determining whether to remove each of the high-fanout circuit devices according to the connection position of each of the high-fanout circuit device comprises:
  keeping each of the high-fanout circuit devices when each of the high-fanout circuit devices is connected between an input terminal of each of the peripheral circuit blocks and a boundary register; and
  removing each of the high-fanout circuit devices when each of the high-fanout circuit devices is connected between the input terminal of each of the peripheral circuit blocks and an internal register which is not the boundary register.

14. The establishing method for the timing model according to claim 10, wherein the step of determining whether to keep or remove the at least one second aggressor path corresponding to each of the second victim paths according to the transmission delay of each of the second victim paths comprises:
  keeping only a fanin driving device and a loading device connected to the second aggressor path when the transmission delay of each of the second victim paths is greater than 0; and
  removing the second aggressor path, a loading device and a driving device of the second aggressor path and a coupling capacitance between the second aggressor path and each of the second victim paths when the transmission delay of each of the second victim paths is equal to 0.

15. The establishing method for the timing model according to claim 10, wherein the second timing analysis mechanism further comprises:
  identifying at least one third victim path and at least one third aggressor path corresponding thereto in the at least one transmission path; and
  determining whether to remove the at least one third aggressor path according to a transmission delay of the at least one third victim path.

16. The establishing method for the timing model according to claim 15, wherein the step of determining whether to remove the at least one third aggressor path according to the transmission delay of the at least one third victim path comprises:
  keeping only a fanin driving device and a loading device on the at least one third aggressor path when the transmission delay on the at least one third victim path is greater than 0; and
  removing the at least one third aggressor path and a plurality of circuit devices correspondingly connected to the at least one third aggressor path when the transmission delay of the at least one third victim path is equal to 0.

* * * * *

UNITED STATES PATENT AND TRADEMARK OFFICE
CERTIFICATE OF CORRECTION

PATENT NO. : 11,256,838 B2  
APPLICATION NO. : 16/865406  
DATED : February 22, 2022  
INVENTOR(S) : Hsin-Hsiung Liao et al.

Page 1 of 1

It is certified that error appears in the above-identified patent and that said Letters Patent is hereby corrected as shown below:

On the Title Page

Item [73], insert --Global Unichip Corporation, Hsinchu (TW); Taiwan Semiconductor Manufacturing Company, Ltd., Hsinchu (TW)--

Signed and Sealed this  
Ninth Day of August, 2022

Katherine Kelly Vidal  
*Director of the United States Patent and Trademark Office*